Oct. 18, 1932.  L. W. DRESSER  1,883,629
RADIATOR GUARD MOUNTING
Filed Oct. 10, 1931
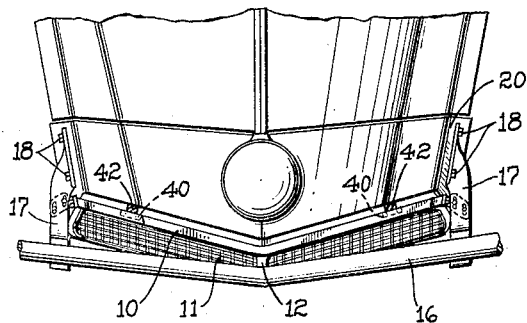
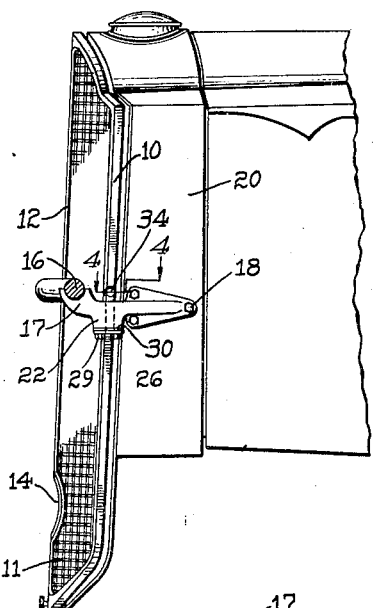
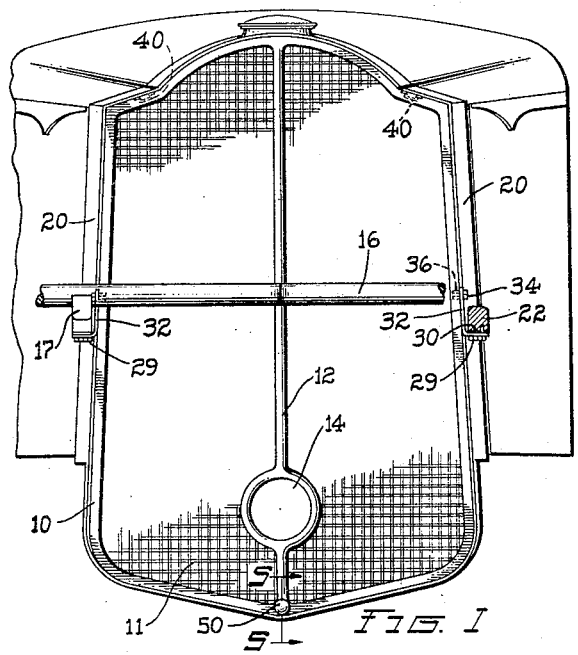
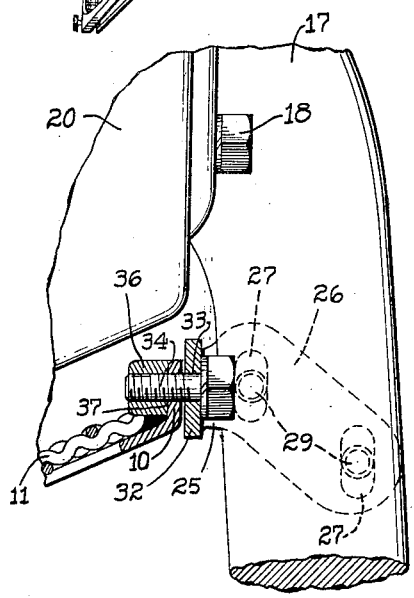
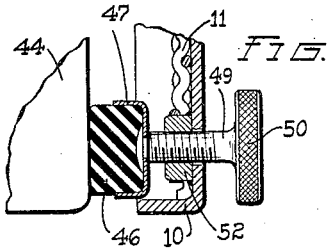
Inventor
LEWIS W. DRESSER.

Patented Oct. 18, 1932

1,883,629

UNITED STATES PATENT OFFICE

LEWIS W. DRESSER, OF DETROIT, MICHIGAN, ASSIGNOR TO PACKARD MOTOR CAR COMPANY, OF DETROIT, MICHIGAN, A CORPORATION OF MICHIGAN

RADIATOR GUARD MOUNTING

Application filed October 10, 1931. Serial No. 568,165.

This invention relates to motor vehicles, and has for its object the provision of improved means for mounting a radiator guard across the front of the vehicle radiator.

Considerable difficulty has been experienced heretofore in mounting ornamental wire mesh guards at the front of the vehicle as the result of the warping and bending of the guard so that even though properly fitted when first installed, the guard is likely to become loose and rattle after a brief period of service. Furthermore, these guards are frequently sold as accessories designed by other than the manufacturer of the vehicle, and it is essential that the guard mounting be adjustable to compensate for small variations in dimension between the guard and the radiator which it is designed to cover.

It is thus an object of the invention to provide a mounting for a radiator guard which will securely maintain the guard against rattling when initially installed and which may be adjusted from time to time to compensate for any distortions of the guard or radiator occurring during subsequent use of the vehicle.

A further object of the invention is the provision of means for mounting a radiator guard in such manner that metal to metal contact will be effected between the guard and the radiator at a minimum number of points.

A more specific object of the invention is the provision of means for pivotally mounting a radiator guard intermediate the upper and lower portions thereof together with means of non-metallic material carried by the upper and lower portions of the guard, such means being relatively adjustable to permit swinging of the guard about its pivotal mounting so that firm contact may be maintained adjacent both the upper and lower portions of the guard with the radiator regardless of changes in dimension or shape of either the guard or radiator such as are likely to occur in service.

It is a feature of the present invention that the pivotal mounting for the guard is associated with or secured to the bracket frequently provided for supporting an ornamental rail extending across the front of the vehicle and serving as a brace for the fenders and a support for the vehicle headlights.

A further object of the invention is the provision of a mounting for a radiator guard which is adjustable in various directions to permit of proper positioning of the guard, regardless of small variations in the size and shape of the guard due to inaccurate dimensioning of the manufactured article.

Further objects and features of the invention will be apparent from the following description taken in connection with the accompanying drawing, in which Figure 1 is a front elevation of a motor vehicle provided with a radiator guard mounted in accordance with the principles of the invention;

Figure 2 is a plan view of the arrangement shown in Fig. 1;

Figure 3 is a side elevation of the arrangement shown in Fig. 1;

Figure 4 is a section taken substantially on line 4—4 of Fig. 3; and

Figure 5 is a section on the line 5—5 of Fig. 1.

Referring now more specifically to the drawing, it will be observed that the radiator guard consists of a substantially rectangular frame 10 serving as a support for the wire mesh 11 and having a central vertical rib 12 formed to provide a circular opening 14 through which the hand crank for manual starting of the car can be inserted. An ornamental bar 16 extending across the front of the radiator and secured to the fenders (not shown) on either side, is mounted on a bracket 17 secured by bolts 18 to the side of the radiator shell 20. An L-shaped plate 25 is secured at a convenient point against the flat under side of a boss 22 formed on the bracket 17, the leg 26 of this plate which engages the bracket being provided with elongated slots 27 through which are passed a plurality of bolts 29 having threaded engagement in recesses formed in the boss 22. Shims 30 are preferably inserted between the leg 26 of the bracket and the boss 22.

The upstanding leg 32 of the bracket 25 is provided with an aperture 33 and a bolt 34 passes through this aperture and is threaded into the side frame 10 of the radiator guard, this construction being preferably strengthened by the provision of a nut 36 which is brazed to the guard frame as at 37. It will be understood that the aperture 33 in the leg 32 of the L-shaped bracket is not threaded, and thus the guard is permitted to rock to a slight extent about the axis of the bolt 33. The construction is similar at each side of the vehicle, and the guard is thus firmly supported on the radiator shell, it being necessary only to position the guard by the provision of means for properly spacing the upper and lower portions thereof from the radiator shell.

For this purpose the upper portion of the guard frame is provided on each side of the longitudinal center of the vehicle with a U-shaped bracket 40 which may be bolted or otherwise secured to the guard frame, and which is designed to receive snugly therein an abutment 42 of non-metallic material, for instance, rubber, which may, if desired, be vulcanized to the guard frame 10 and the bracket 40. These abutments project from the rear face of the guard frame into engagement with the radiator shell 20.

A further abutment, shown in detail in Fig. 5 of the drawing, is mounted in the lower portion of the frame and preferably centrally thereof, this abutment being adjustable rearwardly of the frame into engagement with the downwardly extending apron 44 of the radiator shell frame. A block or pad 46 of resilient non-metallic material, preferably rubber, is mounted within a cup-shaped element 47, as by being vulcanized thereto, the latter being carried by a screw threaded member 49 having a knurled head 50. A nut or threaded bushing 52 is secured as by brazing to the guard frame and receives the threaded element 49.

From the above explanation it will be understood that by reason of the swivel mounting of the guard on the brackets 17, manipulation of the threaded element 49 to project the pad 46 toward the radiator shell will swing the upper end of the guard about the pivotal support into firm engagement with the shell and thus non-metallic contact between the guard and the shell is secured, the degree of contact being adjustable from time to time to compensate for possible warping or bending of the guard or the shell. It will also be apparent that the guard may be bodily adjusted toward or away from the shell either during the initial mounting thereof or subsequently, by reason of the elongated slots 27 provided in the L-shaped bracket 25. Furthermore, the guard may be adjusted vertically to compensate for inaccuracies of manufacture by the insertion of a greater or lesser number of shims between the leg 26 of the bracket 25 and the under side of the boss 22 with which it is held in contact by the bolts 29.

It will be understood that various changes in the details of construction shown herein may be made without departing from the spirit of the invention, and that such alterations and modifications are contemplated as fall within the scope of the appended claims.

Having thus described the invention, what is claimed as new and desired to be secured by Letters Patent is:

1. In a motor vehicle having a radiator, the combination with a radiator guard, of means for pivotally supporting said guard on either side intermediate the upper and lower portions thereof, and abutments interposed between the upper and lower portions of the guard and the radiator, one of said abutments being adjustable for swinging the radiator about the pivotal support therefor to ensure firm engagement of both abutments with the radiator and guard.

2. In a motor vehicle having a radiator including a radiator shell, the combination with a radiator guard adapted to be positioned in front of the said radiator, of means for pivotally supporting said guard intermediate the upper and lower portions thereof, and means carried by one of said portions of the guard and adjustable toward the shell to swing the guard about the pivotal support therefor to position both the upper and lower portions of the guard in firm contact with the shell.

3. In a motor vehicle having a radiator including a surrounding frame, the combination with a radiator guard, of means for supporting said guard intermediate the upper and lower portions thereof, and means for adjusting the upper and lower portions of the guard toward or away from said frame.

4. In a motor vehicle having a radiator and a guard rail extending across said radiator adapted to serve as a lamp support or fender brace, the combination with a radiator guard, of brackets located on each side of said radiator for supporting said rail, and a unitary auxiliary bracket connected to each of said rail brackets and said radiator guard and forming the principal support for the latter.

5. In a motor vehicle having a radiator and a guard rail extending across said radiator adapted to serve as a lamp support or fender brace, the combination with a radiator guard of brackets located on each side of said radiator for supporting said rail, and a unitary auxiliary bracket connected to each of said rail brackets and said radiator guard and forming the principal support for the latter, said auxiliary bracket having a bolt and slot connection with said rail bracket, whereby the radiator guard may be adjusted toward and away from said radiator.

6. In a motor vehicle having a radiator and a guard rail extending across said radiator adapted to serve as a lamp support or fender brace, the combination with a radiator guard of brackets located on each side of said radiator for supporting said rail, and a unitary auxiliary bracket connected to each of said rail brackets and said radiator guard and forming the principal support for the latter, said auxiliary bracket having a bolt and slot connection with said rail bracket, whereby the radiator guard may be adjusted toward and away from said radiator, and means adapted to be interposed between said brackets for adjusting said radiator guard vertically.

7. In a motor vehicle having a radiator, the combination with a radiator guard adapted to be positioned in front of the radiator, of means for pivotally mounting said guard intermediate the upper and lower portions thereof, resilient means carried by the upper and lower portions of the guard and engaging the radiator for maintaining engagement of both portions of the guard therewith, and means for mounting one of said resilient means for adjustment toward and away from the radiator.

In testimony whereof I hereunto affix my signature.

LEWIS W. DRESSER.